A. S. WILLIAMS.
SPRING WHEEL.
APPLICATION FILED AUG. 28, 1911.
1,033,645.
Patented July 23, 1912.
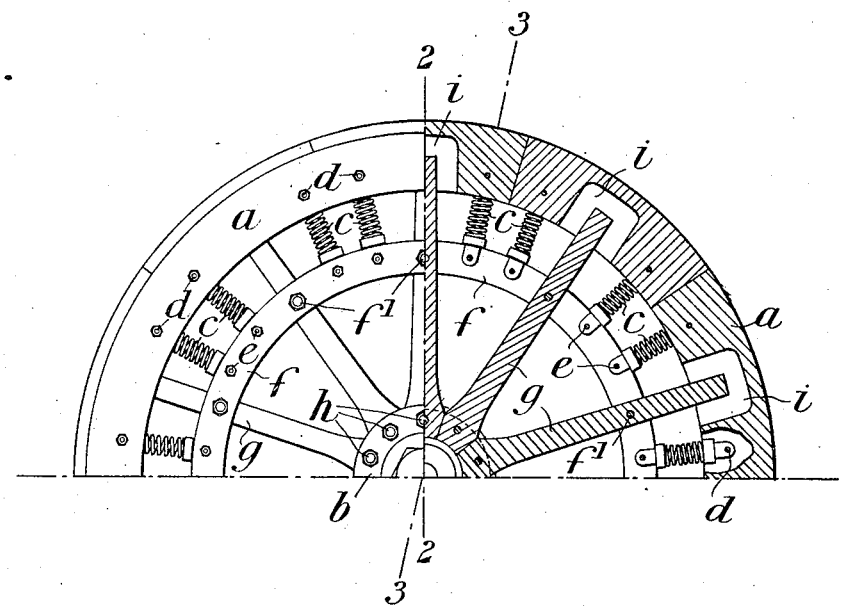
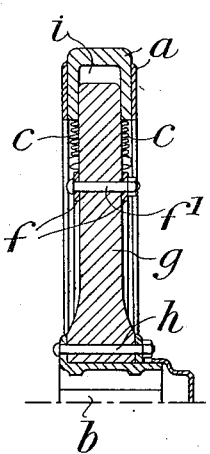
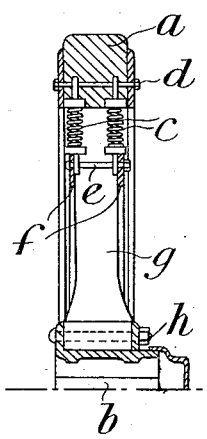
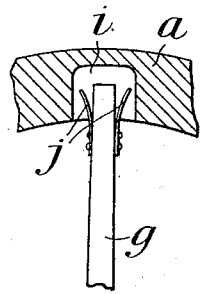

UNITED STATES PATENT OFFICE.

ALFRED STROVER WILLIAMS, OF LONDON, ENGLAND.

SPRING-WHEEL.

1,033,645.  Specification of Letters Patent.  Patented July 23, 1912.

Application filed August 28, 1911. Serial No. 646,343.

*To all whom it may concern:*

Be it known that I, ALFRED STROVER WILLIAMS, a subject of the King of Great Britain, residing at 18 Moorgate street, London, England, have invented new and useful Improvements in Spring-Wheels, of which the following is a specification.

My invention relates to elastic or spring wheels for vehicles and to that type of wheel which comprises a hub and a felly or rim between which and the hub there is arranged a series of springs radially disposed in conjunction with a number of spokes rigidly secured to the hub portion and movably connected to the felly or rim.

The object of my invention is to provide an improved wheel of this class.

According to my invention I arrange between the hub and the rim or felly a series of helical springs radially disposed, the ends of the said springs being rigidly connected by suitable means, as for example, by bolts or screws, respectively to the outer rim or felly and to rings secured to arms or spokes which are rigidly attached to the hub. I preferably make use of a relatively large number of small springs arranged in close proximity to one another around the annular space between the hub and the felly. The spokes or arms above referred to may be of any convenient number, say ten, and are located between the radial springs, being secured at their inner ends, say, by bolts, to the hub and having their outer ends moving in slots in the outer rim or felly in a circumferential and radial direction. To prevent undue distortion of the springs the said radial and circumferential movement is limited and the rigid arms, on coming to the ends of the slots in the outer rim, transmit the driving torque to the outer rim and prevent further distortion of the springs. The said rigid arms are made an easy fit sidewise in the slots in the outer rim and thus prevent the lateral distortion of the wheel due to turning the vehicle or striking an obstacle.

To enable the invention to be fully understood, I will describe the same by reference to the accompanying drawing, in which:—

Figure 1 is a sectional side view of a part of an elastic or spring vehicle wheel constructed according to the invention. Fig. 2 is a section on the line 2—2, Fig. 1. Fig. 3 is a section on the line 3—3, Fig. 1, and Fig. 4 is a view of a detail illustrating a modification.

$a$ is the rim or felly of the wheel, and $b$ is the hub thereof.

$c, c$ represent the helical springs which are radially arranged between the felly $a$ and the hub $b$, the said springs being preferably small springs and being in relatively large number. The outer ends of the springs are secured by means of bolts $d$ to the rim or felly $a$ and their inner ends by similar bolts $e, e$ to rings $f$ which are rigidly secured by bolts $f^1$ to the radial arms or spokes $g$. These arms or spokes $g$ are secured at their inner ends by means of bolts $h$ to the hub $b$ as clearly shown, and at their outer ends enter slots or recesses $i$ formed in the rim or felly $a$. As above stated, these recesses or slots are of such a size that play in a radial and circumferential direction is provided for the spokes $g$, which, also fit easily laterally in the slots, their ends being in some cases fitted with springs such as the blade springs $j, j$ shown in Fig. 4 in order to deaden shocks of impact.

With this construction, when driving torque is applied to say, the hub $b$, the said torque is transmitted through the spokes $g$ to the rings $f$, and thence to the springs $c, c$ in such a manner that the latter are distorted in the circumferential direction to an extent which is determined by the amount of movement of the spokes $g$ in the slots or recesses $i$, since, when the said spokes or arms $g$ come into contact with the further ends of the said slots $i$, they directly transmit the said driving torque to the outer rim $a$ and prevent further distortion of the springs, which springs as will be understood, absorb or take up shocks due to the contact of the wheel with obstacles.

Claims.

1. A spring wheel comprising a hub, spokes rigidly secured thereto, additional means for rigidly securing said spokes intermediate the ends thereof, a felly provided with slots adapted to receive the ends of the spokes, and springs fastened to and connecting said securing means to said felly.

2. A spring wheel comprising a hub, spokes secured to said hub, additional means for rigidly securing said spokes intermediate the ends thereof, a felly provided with a plurality of slots adapted to be slidably engaged by the ends of the spokes, and a plurality of springs connecting the felly and the securing means for said spokes.

3. A spring wheel comprising a hub, a felly, spokes rigidly connected to said hub, a plurality of rings connected to said spokes, a series of springs connected to said rings and to said felly, and slots provided in said felly in which the outer ends of said spokes are adapted to slide.

4. A spring wheel comprising a hub, a felly, spokes rigidly secured to the hub, rings rigidly secured to said spokes, helical springs secured at one end to said rings, the other end being connected to said felly, springs secured to the outer ends of said spokes, and slots formed in said felly in which the outer ends of said spokes are adapted to slide.

ALFRED STROVER WILLIAMS.

Witnesses:
  A. ALBUTT,
  H. D. JAMESON.

Copies of this patent may be obtained for five cents each, by addressing the "Commissioner of Patents, Washington, D. C."